United States Patent
Hasegawa

(10) Patent No.: US 9,607,251 B2
(45) Date of Patent: Mar. 28, 2017

(54) IMAGE RECORDING APPARATUS AND NON-TRANSITORY STORAGE MEDIUM STORING INSTRUCTIONS TO BE EXECUTED BY THE IMAGE RECORDING APPARATUS

(71) Applicant: BROTHER KOGYO KABUSHIKI KAISHA, Nagoya-shi, Aichi-ken (JP)

(72) Inventor: Wataru Hasegawa, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/084,582

(22) Filed: Mar. 30, 2016

(65) Prior Publication Data

US 2016/0292544 A1 Oct. 6, 2016

(30) Foreign Application Priority Data

Mar. 31, 2015 (JP) ................................. 2015-073931
Mar. 31, 2015 (JP) ................................. 2015-073938

(51) Int. Cl.
| | | |
|---|---|---|
| G06F 15/00 | (2006.01) | |
| G06K 1/00 | (2006.01) | |
| G06K 15/00 | (2006.01) | |
| G06K 15/02 | (2006.01) | |
| G06F 3/12 | (2006.01) | |

(52) U.S. Cl.
CPC ....... *G06K 15/1806* (2013.01); *G06F 3/1212* (2013.01); *G06F 3/1248* (2013.01); *G06F 3/1258* (2013.01); *G06F 3/1267* (2013.01); *G06F 3/1286* (2013.01); *G06K 15/1836* (2013.01)

(58) Field of Classification Search
CPC ............ G06K 15/1806; G06K 15/1836; G06F 3/1212; G06F 3/1248; G06F 3/1258; G06F 3/1267; G06F 3/1286
USPC ...................... 358/1.1, 1.14, 1.13, 1.15, 1.16
See application file for complete search history.

(56) References Cited

U.S. PATENT DOCUMENTS

| | | | |
|---|---|---|---|
| 2004/0145776 A1 | 7/2004 | Azami | |
| 2006/0017960 A1* | 1/2006 | Kakigi | ............... H04N 1/00923 358/1.14 |
| 2012/0069375 A1* | 3/2012 | Sasakura | ............... G06F 3/1215 358/1.13 |

FOREIGN PATENT DOCUMENTS

| | | |
|---|---|---|
| JP | 2004180134 A | 6/2004 |
| JP | 2005153426 A | 6/2005 |

* cited by examiner

*Primary Examiner* — Douglas Tran
(74) *Attorney, Agent, or Firm* — Scully, Scott, Murphy & Presser, PC

(57) ABSTRACT

In an image recording apparatus, when an advance notification about execution of interrupt recording is accepted at a first time point that is a middle of creation of raster data on a first processed page of a first job and when an instruction for execution of the interrupt recording is accepted at a second time point that is a middle of creation of raster data on a second processed page of the first job, a controller continues creation of the raster data on the first job and storing of the created raster data until the second time point. The controller stores yet-to-be-recorded raster data that is a portion of the raster data on the first job and that corresponds to at least one page before the second processed page. The controller releases a storage area storing the raster data created for the first job.

14 Claims, 12 Drawing Sheets

IMAGE RECORDING APPARATUS AND NON-TRANSITORY STORAGE MEDIUM STORING INSTRUCTIONS TO BE EXECUTED BY THE IMAGE RECORDING APPARATUS

CROSS REFERENCE TO RELATED APPLICATION

The present application is based on Japanese Patent Application Nos. 2015-073938 filed on Mar. 31, 2015, and 2015-073931 filed on Mar. 31, 2015, the disclosures of which are incorporated herein by reference.

BACKGROUND

Technical Field

The following disclosure relates to an image recording apparatus configured to execute a print processing based on a print job created in a page description language described on a page-by-page basis and to a non-transitory storage medium storing a plurality of instructions to be executed by a processor of the image recording apparatus.

Description of the Related Art

There is known a print processing based on a print job created in a page description language described on a page-by-page basis. One example of the print processing includes: a raster image processor (RIP) processing for analyzing the page description language to create raster data; and a recording processing for recording an image on a printing sheet based on the raster data. Some image recording apparatuses have an interrupt printing function for executing a new print processing during execution of another print processing based on a print job. In the case where another print processing is executed using the interrupt printing function before the completion of a print job created in a page description language and instructed before said another print processing, the RIP processing is paused in response to a user operation on a interrupt button, for example.

SUMMARY

In the above-described technique, the image recording apparatus pauses the RIP processing in response to the user operation on the interrupt button and waits until a processing area is created for execution of the interrupt print processing. When the processing area is created, the image recording apparatus permits execution of the interrupt print processing. However, a restart of the interrupted print processing may be delayed in the case where the RIP processing is paused in response to the user operation on the interrupt button. Specifically, a display displays a setting screen in the interrupt print processing when the interrupt button is operated. This setting screen is a screen for changing or determining settings for the interrupt print processing. When an execution button is operated, the interrupt print processing is executed. That is, in a period from the operation on the interrupt button to the operation on the execution button, the user makes the settings for the interrupt print processing, but the image recording apparatus is in a standby state, which may cause a delay in the interrupted print processing.

Accordingly, an aspect of the disclosure relates to a technique for preventing a delay in an interrupted print processing even in the case where an interrupt print processing is executed during execution of a print processing based on a print job created in a page description language.

In one aspect of the disclosure, an image recording apparatus includes: an image recorder configured to record an image based on image data of one job that is accepted; a user interface configured to accept an input based on a user operation; a first storage; a second storage; and a controller configured to perform: creating raster data by analyzing a page description language described on a page-by-page basis; storing the created raster data into the first storage; controlling the image recorder to record the image based on the raster data stored in the first storage; accepting, via the user interface, advance notification about execution of interrupt recording in which the controller suspends recording based on a first job as the one job and controls the image recorder to perform recording based on a second job, the first job containing a first processed page and a second processed page that is a page after the first processed page; in a case where the advance notification about execution of the interrupt recording is accepted via the user interface at a first time point that is a middle of creation of raster data on the first processed page of the first job and where an instruction for execution of the interrupt recording is accepted via the user interface at a second time point that is a middle of creation of raster data on the second processed page of the first job, continuing creation of the raster data on the first job and storing of the created raster data into the first storage until the second time point is reached; storing yet-to-be-recorded raster data into the second storage on a page-by-page basis, the yet-to-be-recorded raster data being a portion of the raster data on the first job and being stored in the first storage, the yet-to-be-recorded raster data corresponding to at least one page for which recording is not performed by the image recorder and corresponding to at least one page before the second processed page; and in response to storing the yet-to-be-recorded raster data into the second storage, releasing a storage area of the first storage which stores the raster data created for the first job.

In one aspect of the disclosure, a non-transitory storage medium stores a plurality of instructions to be executed by a processor of an image recording apparatus. The image recording apparatus includes: an image recorder configured to record an image based on image data of one job that is accepted; a user interface configured to accept an input based on a user operation; a first storage; and a second storage. The plurality of instructions, when executed by the processor, cause the image recording apparatus to perform: creating raster data by analyzing a page description language described on a page-by-page basis; storing the created raster data into the first storage; controlling the image recorder to record the image based on the raster data stored in the first storage; accepting, via the user interface, advance notification about execution of interrupt recording in which the controller suspends recording based on a first job as the one job and controls the image recorder to perform recording based on a second job, the first job containing a first processed page and a second processed page that is a page after the first processed page; in a case where the advance notification about execution of the interrupt recording is accepted via the user interface at a first time point that is a middle of creation of raster data on the first processed page of the first job and where an instruction for execution of the interrupt recording is accepted via the user interface at a second time point that is a middle of creation of raster data on the second processed page of the first job, continuing the creation of raster data on the first job and storing of the created raster data into the first storage until the second time point is reached; storing yet-to-be-recorded raster data into the second storage on a page-by-page basis, the yet-to-berecorded raster data being a portion of the raster data on the first job and being stored in the first storage, the yet-to-be-recorded raster data corresponding to at least one page for which recording is not performed by the image recorder and corresponding to at least one page before the second processed page; and in response to storing the yet-to-be-recorded raster data into the second storage, releasing a storage area of the first storage which stores the raster data created for the first job.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Configuration of Communication System

Figure 1:
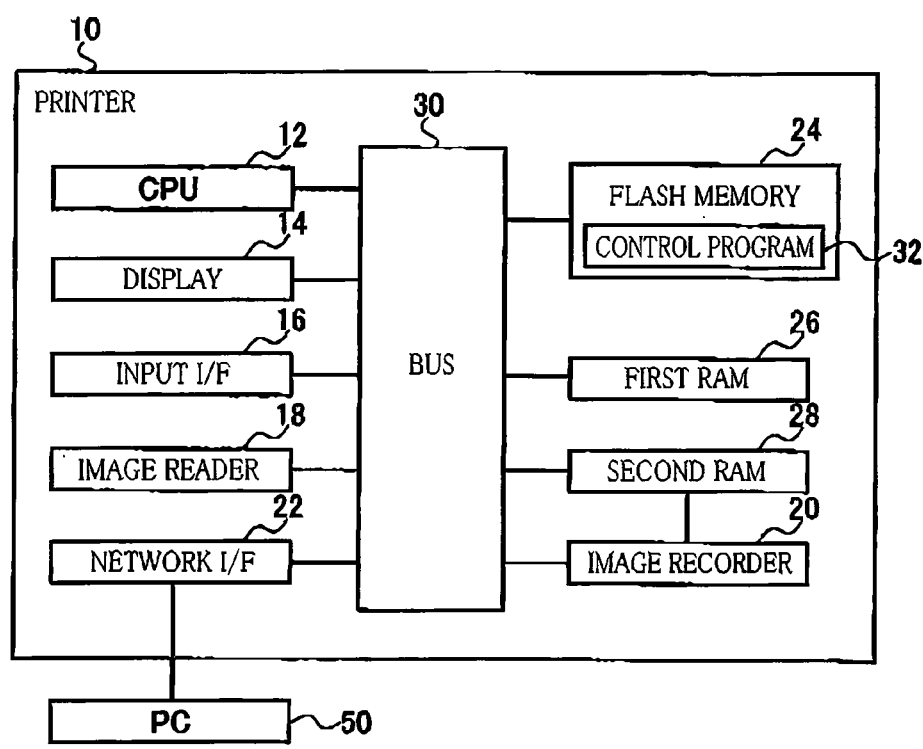
FIG. 1 is a block diagram illustrating a communication system.

Hereinafter, there will be described embodiments by reference to the drawings. FIG. 1 illustrates a communication system 1 according to a first embodiment. The communication system 1 includes a printer 10 as one example of an image recording apparatus, and a personal computer (PC) 50.

The printer 10 includes a central processing unit (CPU) 12 as one example of a controller and a processor, a display 14, an input interface 16 as one example of a user interface, an image reader 18, an image recorder 20, a network interface 22, a flash memory 24 as one example of a second storage, a first random access memory (RAM) 26 as one example of a first storage, and a second RAM 28. These devices are communicable with each other by a bus 30.

The display 14 has a display surface for displaying various kinds of functions of the printer 10. The input interface 16 includes keys for implementation of the functions of the printer 10. One example of the input interface 16 is a touch screen provided integrally with the display 14. In this case, the input interface 16 accepts a user operation performed on an icon displayed on the display 14. Other examples of the input interface 16 include hardware keys.

The image reader 18 is a device which creates image data by reading an image formed on a document placed on a flat bed or an automatic document feeder (ADF). The image reader 18 includes a CCD image sensor and a contact image sensor, for example. The image recorder 20 is a printing mechanism. Examples of the image recorder 20 include an ink-jet printer and an electronic photographic printer. The CPU 12 inputs drive signals to the image recorder 20. In the case where the image recorder 20 is an ink-jet head, the image reader 20 ejects ink from its nozzles based on the input drive signals.

The network interface 22 communicates with external devices. The network interface 22 is connected to the PC 50 located on a network on which the printer 10 is located. This configuration enables the printer 10 to perform data communication with the PC 50 via the network interface 22.

The flash memory 24 is a non-transitory memory which stores a control program 32 and various kinds of data. Each of the first RAM 26 and the second RAM 28 is a transitory memory which stores various kinds of data created in a print processing. It is noted that the second RAM 28 is connected to the image recorder 20.

The CPU 12 executes processings according to a control program 32. The control program 32 is a program for execution of the print processing. Hereinafter, the CPU 12 that executes programs such as the control program 32 may be simply referred to as the name of the program. For example, the wording "the control program 32 executes" may mean "the CPU 12 that executes the control program 32 executes".

Print Processing using Communication System

In this communication system 1, the PC 50 creates a print job containing a plurality of pages described in a page description language on a page-by-page basis. The PC 50 transmits the created print job to the printer 10, and the printer 10 executes the print processing in accordance with the print job. The page description language is a computer language for giving a drawing instruction to the image recording apparatus such as the printer 10. Examples of the page description language include Post Script® (registered trademark of Adobe Systems Incorporated) and Printer Command Language® (PCL) (registered trademark of Hewlett-Packard Company).

When the printer 10 receives a print job created in the page description language (as one example of a first job and a second job), the printer 10 executes a raster image processor (RIP) processing for the print job. In the RIP processing, the printer 10 analyzes the page description language described in units of pages, creates raster data, and stores the created raster data into the first RAM 26. When raster data on one page is stored into the first RAM 26, the raster data on the one page is transferred into the second RAM 28. The second RAM 28 is connected to the image recorder 20 as described above, and the image recorder 20 acquires the raster data from the second RAM 28 and records an image on a recording sheet based on the raster data. That is, the image recorder 20 executes a recording processing for recording the image based on the raster data on the one page which is stored in the second RAM 28. The above-described processing is repeated, and thereby the page description language on all the pages which is transmitted from the PC 50 is converted into the raster data. Images are recorded on recording sheets based on the raster data on all the pages. As a result, a print processing based on the print job transmitted from the PC 50 is finished.

The printer 10 has an interrupt printing function. Thus, during execution of the print processing based on the print job, another print processing may be executed in some cases. In this case, the RIP processing and the recording processing of the print processing based on the print job are suspended, and a print processing using the interrupt printing function is executed. This print processing will be hereinafter referred to as "interrupt print processing". Upon the completion of the interrupt print processing, the RIP processing and the recording processing of the suspended print processing are restarted. When the interrupt print processing is executed, the print processing previously executed (hereinafter may be referred to as "earlier print processing") is suspended, the earlier print processing is delayed.

Figure 2:
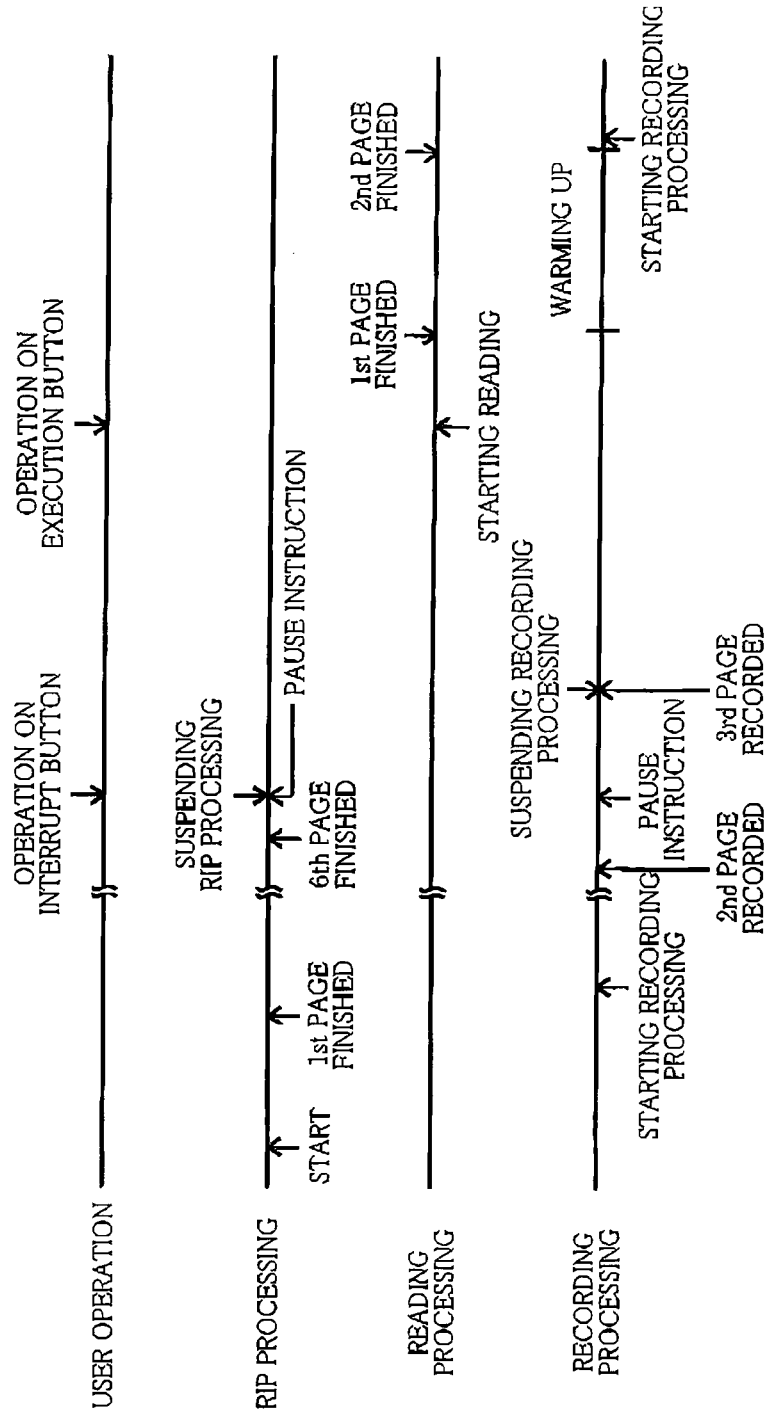
FIG. 2 is a view illustrating a relationship among user operations and progresses of a RIP processing, a reading processing, and a recording processing in a conventional interrupt print processing.

Specifically, as illustrated in FIG. 2, upon receiving the print job created in the page description language, the printer 10 starts executing the RIP processing. The printer 10 analyzes the page description language on a document of a first page and creates raster data. The created raster data on the first page is stored into the first RAM 26. As a result, the RIP processing for the document of the first page is finished. The raster data on the first page which is stored in the first RAM 26 is then transferred into the second RAM 28. The image recorder 20 executes the recording processing for recording an image based on the raster data transferred to the second RAM 28. That is, the image recorder 20 starts executing the recording processing for the print job created in the page description language.

The input interface 16 of the printer 10 includes an interrupt button, not illustrated, for providing an advance notification about the interrupt print processing. This advance notification is one example of the advance notification about execution of the interrupt recording. The advance notification indicates that the printer 10 suspends a print processing for a print job (as one example of a first job) for which the print processing is being executed, and executes a print processing for a new print job (as one example of a second job). In a conventional interrupt print processing, the earlier print processing is instantly suspended in response to operation on the interrupt button. Specifically, as illustrated in FIG. 2, a pause instruction is output when the interrupt button is operated while the page description language on the seventh page (as one example of a first processed page) is being converted into the raster data after the page description language on the first to sixth pages is converted into the raster data in the RIP processing for the earlier print processing, for example. The RIP processing is suspended in accordance with the pause instruction during conversion of the page description language on the seventh page to the raster data (noted that this time point is one example of a first time point).

The pause instruction is output in response to the user operation performed on the interrupt button, and the recording processing of the earlier print processing is suspended after the completion of the recording processing being executed at the user operation. That is, the pause instruction is output when the interrupt button is operated during recording of the image on the recording sheet based on the raster data on the third page, for example. The recording processing is suspended in accordance with the pause instruction after the completion of the recording processing based on the raster data on the third page.

In this embodiment, there will be described a case where image recording is performed on one recording sheet based on raster data on one page. For example, in the case where image recording is performed on one recording sheet based on raster data on a plurality of pages, the recording processing is suspended after the completion of recording of images on the one recording sheet based on the raster data on the plurality of pages. In the case where a plurality of recording sheets are conveyed at the same time along a conveyance path of the printer 10, the recording processing is suspended after the completion of recording of images on the recording sheets being conveyed along the conveyance path in addition to the recording sheet on which the recording processing is being executed at the interrupt button operation. Further, in the case where images are recorded on front surfaces of respective recording sheets, and then images are recorded on back surfaces of the respective recording sheets, the recording processing is suspended after the completion of image recording on the front and back surfaces of the recording sheets. That is, the recording processing is suspended after the completion of the recording processing for recording images based on a group of page-by-page raster data containing raster data on one page as a subject of the recording processing being executed at the interrupt button operation.

In response to the user operation on the interrupt button, the display 14 of the printer 10 displays a setting screen. The user can make settings for the interrupt print processing on this setting screen, for example. This setting screen contains an execution button, not illustrated, as a portion of the input interface 16. The execution button, when operated, instructs execution of a print processing for a new print job (as one example of a second job) to be executed in accordance with the advance notification of the interrupt print processing. The interrupt print processing is executed when the execution button is operated after the settings for the interrupt print processing are changed or determined as needed. Specifically, in response to the operation on the execution button, the documents placed on the flat bed or the ADF are read by the image reader 18, and when the reading processing is finished for the document of the first page, the recording processing is started for the document of the first page. It should be noted that warm-up of the image recorder 20 is required for the recording processing, and accordingly the recording processing is started after the completion of the warm-up of the image recorder 20.

In the conventional interrupt print processing, as described above, the RIP processing of the earlier print processing is instantly suspended in response to the user operation on the interrupt button, and the recording processing of the earlier print processing is suspended after the completion of the recording processing for one page which is being executed. However, the user changes or determines the settings for the interrupt print processing between the operation on the interrupt button and the operation on the execution button, and, during this time period, the printer 10 is in a standby state without executing processings other than the recording processing for recording the images based on the group of the page-by-page raster data containing the raster data on the one page as a subject of the recording processing being executed at the interrupt button operation. This printer 10 executes the earlier print processing in this time period to effectively use a time corresponding to the standby state. This configuration can reduce the delay of the earlier print processing.

Figure 3:
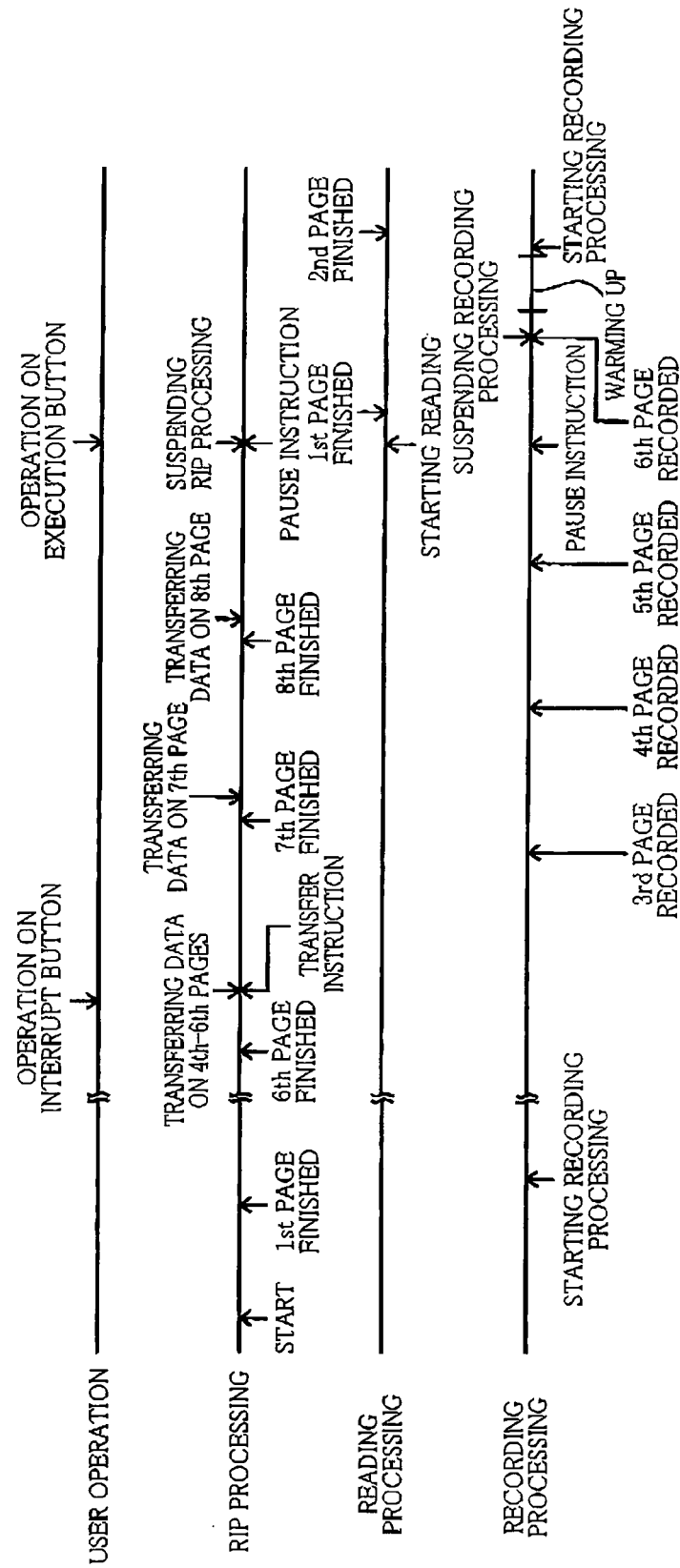
FIG. 3 is a view illustrating a relationship among user operations and progresses of a RIP processing, a reading processing, and a recording processing in an interrupt print processing in the present disclosure.

Specifically, as in the above-described explanation, the RIP processing is continuously executed even when the RIP processing of the earlier print processing is finished for converting the page description language on the first to sixth pages to the raster data, and the interrupt button is then operated during conversion of the page description language on the seventh page to the raster data, for example. It should be noted that when the interrupt button is operated, as illustrated in FIG. 3, the printer 10 outputs an instruction for transferring the raster data stored in the first RAM 26 into the flash memory 24. When this instruction is output, the raster data for which the recording processing has not been executed among the raster data stored in the first RAM 26 is stored into the flash memory 24 on a page-by-page basis. The raster data stored in the first RAM 26 is held also after the raster data is stored into the flash memory 24.

Figure 4:
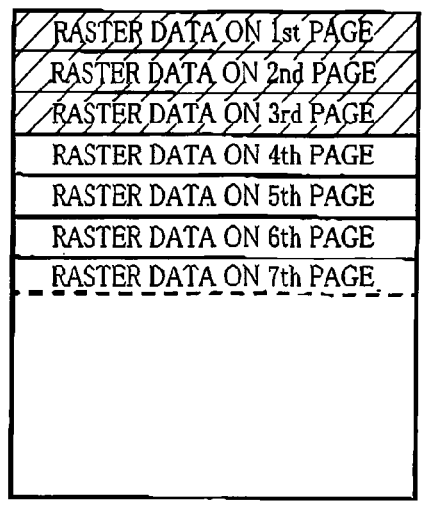
FIG. 4 is a view conceptually illustrating raster data stored in a first RAM.

Specifically, when the interrupt button is operated during the conversion of the page description language on the seventh page to the raster data and during execution of the recording processing based on the raster data on the third page, the first RAM 26 stores (i) the raster data on the fourth to sixth pages on a page-by-page basis and (ii) the raster data on a portion of the seventh page, i.e., the raster data created by partially converting the page description language on the seventh page. Thus, the first RAM 26 stores the raster data as illustrated in FIG. 4. It is noted that FIG. 4 conceptually illustrates the raster data stored in the first RAM 26. Specifically, the hatched raster data indicates the raster data for which the recording processing is finished. An area of the first RAM 26 which had stored these raster data has already been released. Also, the raster data defined by the broken line indicates the raster data having an amount less than one page.

In the case where the raster data is stored in the first RAM 26 as illustrated in FIG. 4, when a transfer instruction for transferring the raster data is output, as illustrated in FIG. 3, the raster data on the fourth to sixth pages is stored into the flash memory 24. The raster data on the fourth to sixth pages is held in the first RAM 26 (the second RAM 28). As a result, as will be described below, the recording processing is continued based on the raster data stored in the first RAM 26 (the second RAM 28). As described above, the RIP processing is not directly suspended in response to the user operation on the interrupt button but suspended during transferring of the raster data. That is, the RIP processing is suspended upon accepting the transfer instruction for transferring the raster data but is restarted upon the completion of the transfer of the raster data.

When the RIP processing is restarted upon the completion of the transfer of the raster data, the RIP processing is continuously executed until the execution button is operated. That is, when the interrupt button is operated during creation of the raster data on the seventh page, the RIP processing is continuously executed except for a time period in which the raster data is transferred. During this RIP processing, the user changes or determines the settings for the interrupt print processing, for example. When the RIP processing is progressed, and the RIP processing for the raster data on the seventh page is finished, the raster data on the seventh page is stored into the flash memory 24 on a page-by-page basis. The area of the first RAM 26 which has stored the raster data on the seventh page is held. When the RIP processing is further progressed, and the RIP processing for the raster data on the eighth page is finished, the raster data on the eighth page is stored into the flash memory 24 on a page-by-page basis, and the area of the first RAM 26 which has stored the raster data on the eighth page is held.

The pause instruction is output when the execution button is operated during creation of the raster data on the ninth page (as one example of a second processed page), i.e., during conversion of the page description language on the ninth page to the raster data (noted that this time point is one example of a second time point), for example. When the pause instruction is output, the RIP processing is instantly suspended. That is, the creation of the raster data is continued until the time point when the execution button is operated (noted that this time point is another example of the second time point). It is noted that when the RIP processing is suspended during the creation of the raster data on the ninth page, the first RAM 26 stores the raster data on pages from the page for which the recording processing has not been started (the seventh page in this example) to the ninth page created before the suspension. It is noted that the raster data on the ninth page has an amount less than one page. The area of the first RAM 26 which stores these raster data is released.

In the example illustrated in FIG. 2, when the conventional interrupt print processing is executed, only the raster data on the first to sixth pages can be created. When the interrupt print processing is executed in this printer 10, however, the raster data on the first to eighth pages can be created in the example illustrated in FIG. 3. This configuration can use a needless standby time to create a large amount of raster data, resulting in reduced delay of the earlier print processing.

However, when the execution button is operated just after the interrupt button is operated, the raster data created in the interrupt button operation is deleted, so that the continuation of the RIP processing is wasted. Specifically, as described above, the creation of the raster data is continued even when the interrupt button is operated during creation of the raster data on the seventh page, i.e., during conversion of the page description language on the seventh page to the raster data (noted that this time point is one example of the first time point). Thus, the raster data on the seventh page is normally created and stored into the first RAM 26. However, the RIP processing is instantly suspended in the case where the execution button is operated before the raster data on the entire seventh page is stored into the first RAM 26 in the continued RIP processing, i.e., during the conversion of the page description language on the seventh page to the raster data (noted that this time point is one example of a third time point) after a time point when the interrupt button is operated (noted that this time point is another example of the first time point). In this case, accordingly, the creation of the raster data on the seventh page is suspended, and the area of the first RAM 26 which has stored the raster data on the seventh page created before the suspension is released. That is, the raster data on the seventh page being created in the continued RIP processing is deleted. Thus, the continuation of the RIP processing is wasted.

In view of the above, this printer 10 does not suspend the RIP processing in response to the operation on the execution button until the RIP processing is finished for the page description language on the page being analyzed when the interrupt button is operated. That is, the RIP processing is suspended in response to the operation on the execution button on condition that the RIP processing is finished for the page description language on the page being analyzed when the interrupt button is operated. That is, in this printer 10, the RIP processing is continued until the completion of the RIP processing for the page description language on the page being analyzed when the interrupt button is operated. Thus, as described above, when the interrupt button is operated during analysis of the page description language on the seventh page, the RIP processing is suspended in response to the operation on the execution button after the RIP processing is finished for the page description language on the seventh page. This processing can finish the RIP processing for the page description language on the page being analyzed when the interrupt button is operated, whereby the continuation of the RIP processing is not wasted.

It is noted that the printer 10 stores, into the first RAM 26, a page for which the page description language is being analyzed in the RIP processing at the timing when the interrupt button is operated. This page may be hereinafter referred to as "interrupt-button-operation-timing page". Also, the printer 10 stores, into the first RAM 26, a page for which the page description language is being analyzed in the RIP processing at the timing when the execution button is operated. This page may be hereinafter referred to as "execution-button-operation-timing page". When the execution-button-operation-timing page and the interrupt-button-operation-timing page are the same as each other, the interrupt button and the execution button are operated during execution of the RIP processing for the page description language on a certain page. That is, the execution button is operated before the RIP processing is finished for the page description language on the page being analyzed when the interrupt button is operated. Thus, when the execution-button-operation-timing page and the interrupt-button-operation-timing page are the same as each other, the printer 10 at this time does not suspend the RIP processing in response to the operation on the execution button.

When the execution-button-operation-timing page differs from the interrupt-button-operation-timing page, the interrupt button is operated during execution of the RIP processing for the page description language on a certain page (as another example of the first processed page), and the execution button is operated during execution of the RIP processing for the page description language on a page after the certain page (which is another example of the second processed page). That is, the execution button is operated after the RIP processing is finished for the page description language on the page being analyzed when the interrupt button is operated. Thus, when the execution-button-operation-timing page and the interrupt-button-operation-timing page are different from each other, the RIP processing is suspended in response to the operation on the execution button.

In this printer 10, as in the RIP processing, the recording processing is continuously executed even when the conversion of the page description language on the first to sixth pages to the raster data is finished, and the interrupt button is then operated during the conversion of the page description language on the seventh page to the raster data, for example. As illustrated in FIG. 3, when the execution button is operated during creation of the raster data on the ninth page, the pause instruction is output, and the recording processing is suspended after the completion of the recording processing being executed when the execution button is operated. That is, the pause instruction is output when the execution button is operated during recording of the image on the recording sheet based on the raster data on the sixth page, for example. The recording processing is suspended after the completion of the recording processing based on the raster data on the sixth page.

In the example illustrated in FIG. 2, when the conventional interrupt print processing is executed, the recording processing is executed for only three pages. When the interrupt print processing is executed in the printer 10, however, the recording processing can be executed for six pages in the example illustrated in FIG. 3. This configuration can use a needless standby time to execute the recording processing for a large number of pages, resulting in reduced delay of the earlier print processing.

When the interrupt print processing is executed in response to the operation on the execution button, as illustrated in FIG. 3, the image reader 18 starts the reading processing to read the documents placed on the flat bed or the ADF. When the reading processing for the document of the first page is finished, the recording processing is started for the document of the first page. In this printer 10, as described above, when the pause instruction is output in response to the operation on the execution button, the recording processing is suspended after the completion of the recording processing being executed at the timing when the pause instruction is output. Thus, the recording processing of the earlier print processing is executed just before the start of the recording processing of the interrupt print processing, whereby warm-up of the image recorder 20 requires a short time when compared with the case where a long time is elapsed after the completion of the last recording processing. This configuration can reduce a time required for the warm-up of the image recorder 20 in the earlier print processing. It is noted that the warm-up includes flushing and purging in the case where the image recorder 20 is an ink-jet head, and the warm-up indicates heating of a fuser in the case where the image recorder 20 is an electronic photographic printer.

When the interrupt print processing is finished, an instruction for canceling the pause of the RIP processing is output, so that the printer 10 executes a processing for returning the raster data transferred to the flash memory 24, to the first RAM 26. That is, the printer 10 stores, into the first RAM 26, the page-by-page raster data which is stored in the flash memory 24 in response to the transfer instruction. The printer 10 releases the area of the flash memory 24 which have stored the page-by-page raster data stored in the first RAM 26. As a result, the raster data transferred to the flash memory 24 is returned to the first RAM 26. In this processing, the printer 10 deletes the raster data corresponding to the pages for which the recording processing has already been finished.

The RIP processing is restarted when the instruction for canceling the pause of the RIP processing is output. However, the restart of the RIP processing is suspended during execution of the return processing for transferring the raster data back to the first RAM 26. That is, the RIP processing is restarted on condition that the instruction for canceling the pause of the RIP processing is output, and the return processing for returning the raster data to the first RAM 26 is not being executed. In the restart of the RIP processing, the printer 10 creates the raster data from the beginning for the page being created at the suspension of the RIP processing. That is, in the case where the RIP processing is suspended during creation of the raster data on the ninth page, for example, the page description language on the ninth page is analyzed from the beginning to create the raster data on the ninth page in the restart of the RIP processing. This is because the area of the first RAM 26 which had stored the raster data being created is released at the suspension of the RIP processing, and the raster data is deleted.

When the interrupt print processing is finished, an instruction for canceling the pause of the recording processing is output, so that the recording processing is restarted based on the raster data. That is, the raster data on a page next to the page for which the recording processing is finished is transferred from the first RAM 26 to the second RAM 28, and the image recorder 20 executes the recording processing based on the raster data stored in the second RAM 28.

The page description language on all the pages which is transmitted from the PC 50 is converted into the raster data, and images are recorded on recording sheets based on the raster data on all the pages. As a result, the print processing based on the print job transmitted from the PC 50 is finished.

Control Program

The print processing is executed when the control program 32 is executed by the CPU 12 of the printer 10. When the control program 32 is executed, the CPU 12 executes four flows illustrated in FIG. 5, FIGS. 6-8, FIGS. 9-10, and FIG. 11. There will be explained the four flows with reference to FIG. 5, FIGS. 6-8, FIGS. 9-10, and FIG. 11.

Figure 5:
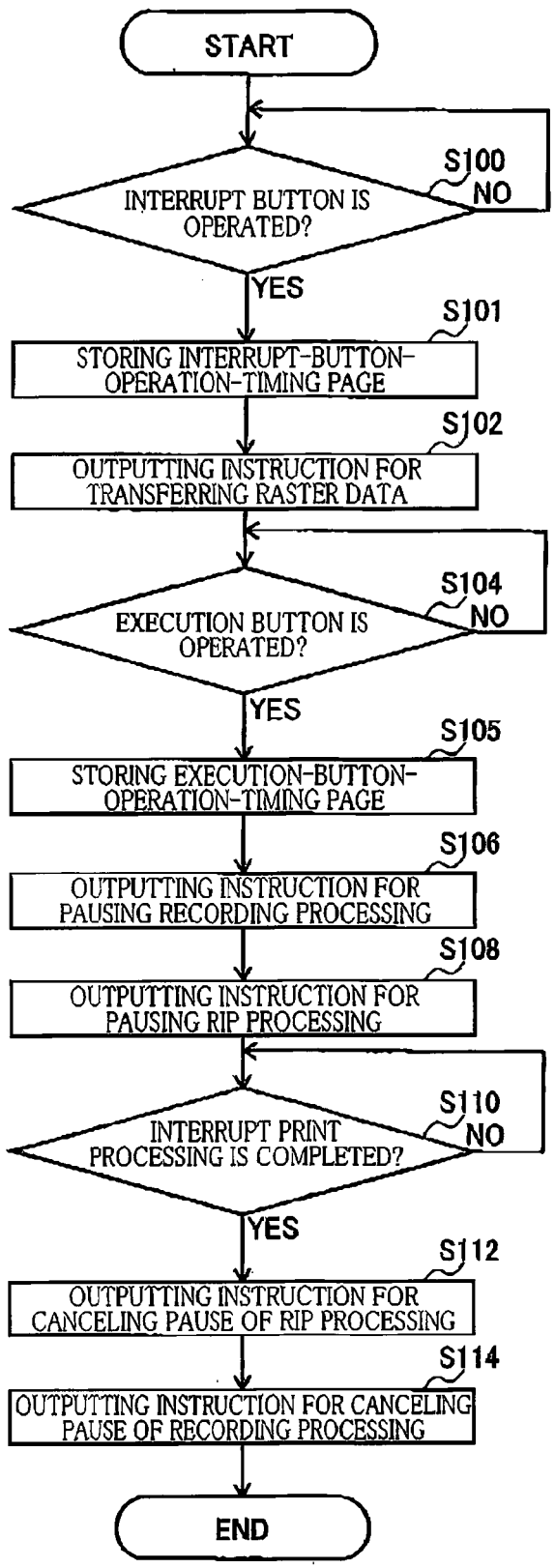
FIG. 5 is a flow chart illustrating processings in a printer according to a first embodiment.

When the control program 32 is executed by the CPU 12, as illustrated in FIG. 5, the CPU 12 at S100 determines whether the interrupt button is operated. When the interrupt button is not operated (S100: NO), the CPU 12 repeats the processing at S100. When the interrupt button is operated (S100: YES), the CPU 12 at S101 stores the interrupt-button-operation-timing page into the first RAM 26. The CPU 12 at S102 outputs the transfer instruction for transferring the raster data. The CPU 12 at S104 determines whether the execution button is operated.

When the execution button is not operated (S104: NO), the CPU 12 repeats the processing at S104. When the execution button is operated (S104: YES), the CPU 12 at S105 stores the execution-button-operation-timing page into the first RAM 26. The CPU 12 at S106 outputs an instruction for pausing the recording processing. The CPU 12 at S108 outputs an instruction for pausing the RIP processing. The CPU 12 at S110 determines whether the interrupt print processing is finished. When the interrupt print processing is not finished (S110: NO), the CPU 12 repeats the processing at S110. When the interrupt print processing is finished (S110: YES), the CPU 12 at S112 outputs the instruction for canceling the pause of the RIP processing. The CPU 12 at S114 outputs an instruction for canceling the pause of the recording processing, and this flow ends.

Figure 6:
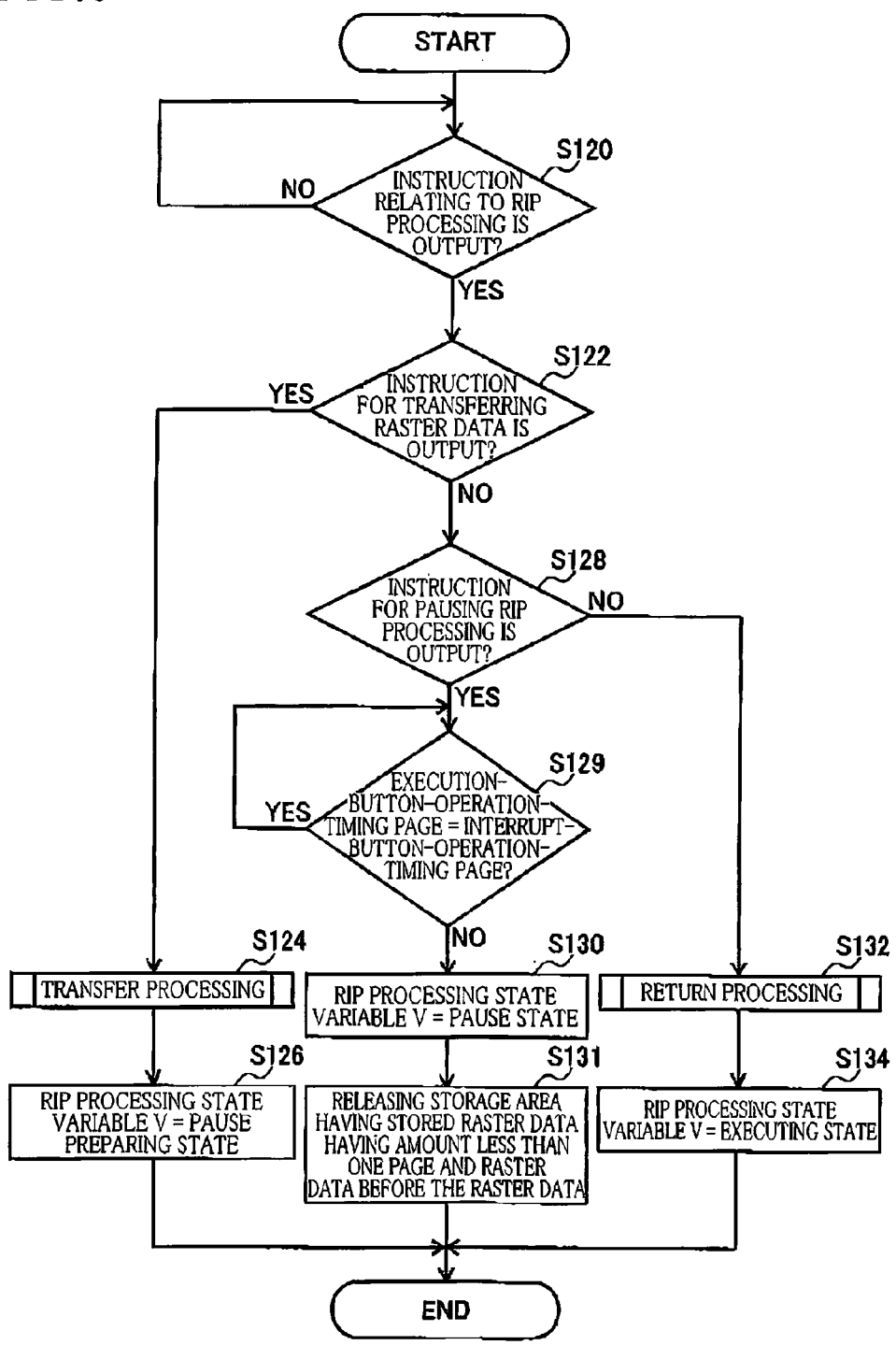
FIG. 6 is a flow chart illustrating processings in the printer according to the first embodiment.

When the control program 32 is executed by the CPU 12, as illustrated in FIG. 6, the CPU 12 at S120 determines whether an instruction relating to the RIP processing is output. Examples of the instruction relating to the RIP processing include the transfer instruction for transferring the raster data, the instruction for pausing the RIP processing, and the instruction for canceling the pause of the RIP processing. When the instruction relating to the RIP processing is not output (S120: NO), the CPU 12 repeats the processing at S120. When the instruction relating to the RIP processing is output (S120: YES), the CPU 12 at S122 determines whether the instruction relating to the RIP processing is the transfer instruction for transferring the raster data.

Figure 7:
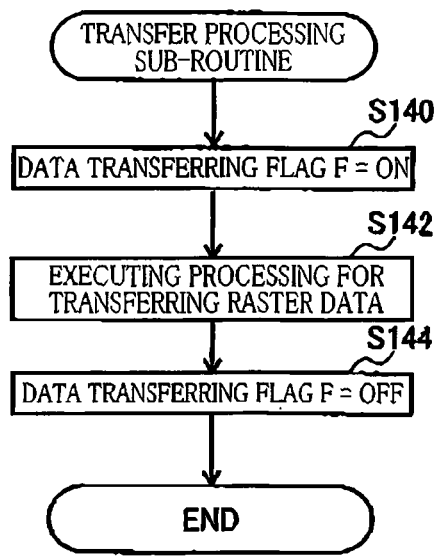
FIG. 7 is a flow chart illustrating processings in the printer according to the first embodiment.

When the instruction relating to the RIP processing is the transfer instruction for transferring the raster data (S122: YES), the CPU 12 at S124 executes a transfer processing sub-routine. In the transfer processing sub-routine, as illustrated in FIG. 7, the CPU 12 at S140 sets a data transferring flag F to ON. The data transferring flag F indicates whether the processing for transferring the raster data or the return processing is being executed. When the data transferring flag F is ON, the processing is being executed. When the data transferring flag F is OFF, the processing has already been finished. The CPU 12 at S142 executes the processing for transferring the raster data. When the processing for transferring the raster data is finished, the CPU 12 at S144 sets the data transferring flag F to OFF, and the transfer processing sub-routine ends.

When the transfer processing sub-routine ends, the flow returns to S126 in FIG. 6 at which the CPU 12 sets a RIP processing state variable V to a pause preparing state. The RIP processing state variable V indicates a state of the RIP processing. States of the RIP processing include an executing state, a pause state, and the pause preparing state. When the RIP processing state variable V is the executing state, the RIP processing state variable V indicates that the CPU 12 is to execute a normal RIP processing. When the RIP processing state variable V is the pause state, the RIP processing state variable V indicates that the CPU 12 suspends the RIP processing. When the RIP processing state variable V is the pause preparing state, the RIP processing state variable V indicates that the CPU 12 is to continue the RIP processing in the interrupt print processing. When the RIP processing state variable V is set to the pause preparing state, this flow ends.

When the CPU 12 at S122 determines that the instruction relating to the RIP processing is not the transfer instruction for transferring the raster data (S122: NO), the CPU 12 at S128 determines whether the instruction relating to the RIP processing is the instruction for pausing the RIP processing. When the instruction relating to the RIP processing is the instruction for pausing the RIP processing (S128: YES), the CPU 12 at S129 determines whether the execution-button-operation-timing page and the interrupt-button-operation-timing page stored in the first RAM 26 are the same as each other. When the execution-button-operation-timing page and the interrupt-button-operation-timing page are the same as each other (S129: YES), the CPU 12 repeats the processing at S129. When the execution-button-operation-timing page and the interrupt-button-operation-timing page are different from each other (S129: NO), the CPU 12 at S130 sets the RIP processing state variable V to the pause state. The CPU 12 at S131 releases the area of the first RAM 26 which has stored the raster data having an amount less than one page and the raster data on the pages before the page of the raster data having an amount less than one page, and this flow ends.

Figure 8:
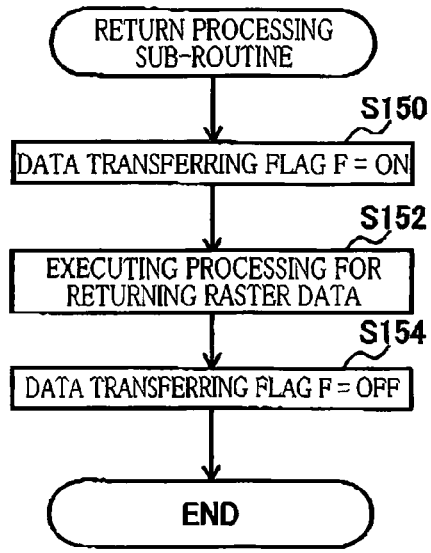
FIG. 8 is a flow chart illustrating processings in the printer according to the first embodiment.

The CPU 12 at S128 determines that the instruction relating to the RIP processing is not the instruction for pausing the RIP processing (S128: NO), that is, when the instruction relating to the RIP processing is the instruction for canceling the pause of the RIP processing, the CPU 12 at S132 executes a return processing sub-routine. In the return processing sub-routine, as illustrated in FIG. 8, the CPU 12 at S150 sets the data transferring flag F to ON. The CPU 12 at S152 executes the return processing for returning the raster data. In this processing, the raster data on the pages for which the recording processing has already finished is deleted from the flash memory 24 without being stored into the first RAM 26. When the return processing for returning the raster data is finished, the CPU 12 at S154 sets the data transferring flag F to OFF, and the return processing sub-routine ends. When the return processing sub-routine ends, this flow returns to S134 in FIG. 6 at which the CPU 12 sets the RIP processing state variable V to the executing state, and this flow ends.

Figure 9:
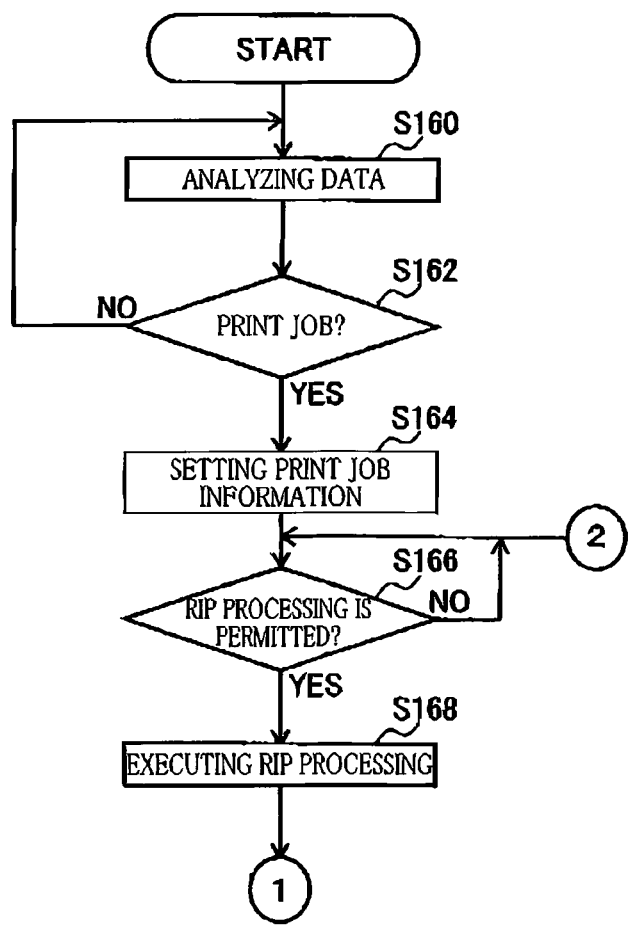
FIG. 9 is a flow chart illustrating processings in the printer according to the first embodiment.
Figure 10:
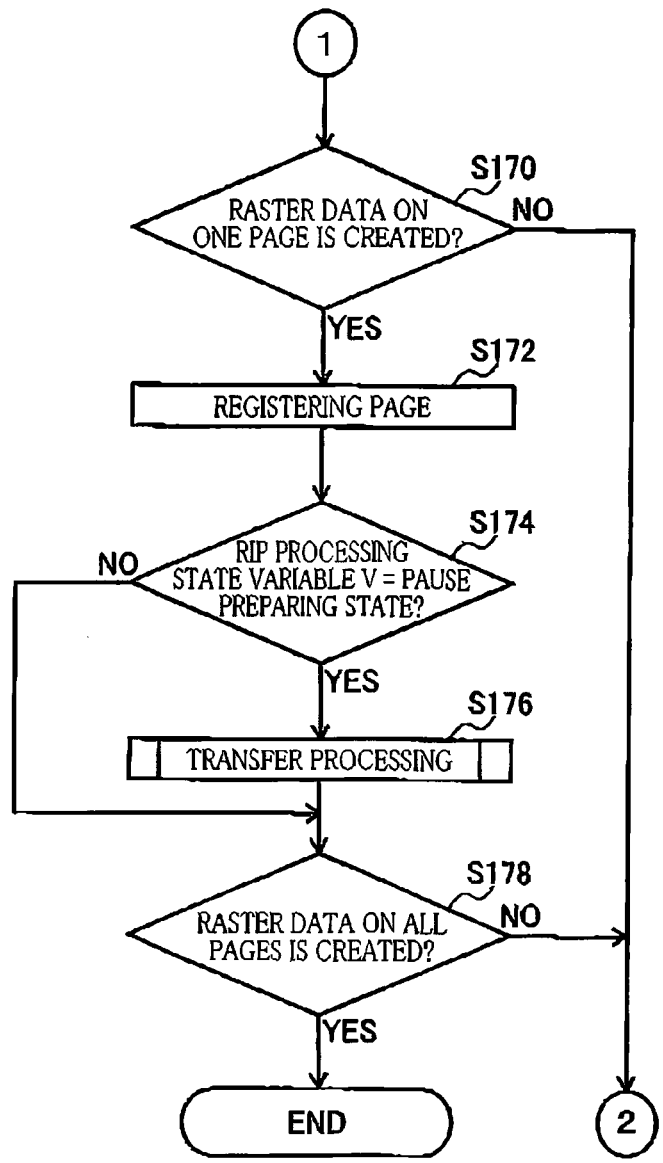
FIG. 10 is a flow chart illustrating processings in the printer according to the first embodiment.

When the control program 32 is executed by the CPU 12, as illustrated in FIG. 9, the CPU 12 at S160 analyzes data input to the printer 10. The CPU 12 at S162 determines whether the input data is the print job. When the input data is not the print job (S162: NO), the CPU 12 repeats the processing at S162. When the input data is the print job (S162: YES), the CPU 12 at S164 makes settings on print job information, that is, the CPU 12 makes settings in accordance with print information contained in the print job.

The CPU 12 at S166 determines whether the RIP processing is permitted. Specifically, when the data transferring flag F is OFF, and the RIP processing state variable V is the pause preparing state or the executing state, the CPU 12 determines that the RIP processing is permitted. That is, when the data transferring flag F is ON or the RIP processing state variable V is the pause state, the CPU 12 determines that the RIP processing is not permitted. When the RIP processing is not permitted (S166: NO), the CPU 12 repeats the processing at S166.

When the RIP processing is permitted (S166: YES), the CPU 12 at S168 executes the RIP processing. The CPU 12 at S170 determines whether raster data on one page is created. When the raster data on the one page is not created (S170: NO), this flow returns to S166. When the raster data on the one page is created (S170: YES), the CPU 12 at S172 registers the raster data on the one page.

The CPU 12 at S174 determines whether the RIP processing state variable V is the pause preparing state. When the RIP processing state variable V is not the pause preparing state (S174: NO), this flow goes to S178. When the RIP processing state variable V is the pause preparing state (S174: YES), the CPU 12 at S176 executes the transfer processing sub-routine illustrated in FIG. 7. The CPU 12 at S178 determines whether the raster data on all the pages is created. When the raster data on all the pages is not created (S178: NO), this flow returns to S166. When the raster data on all the pages is created (S178: YES), this flow ends.

Figure 11:
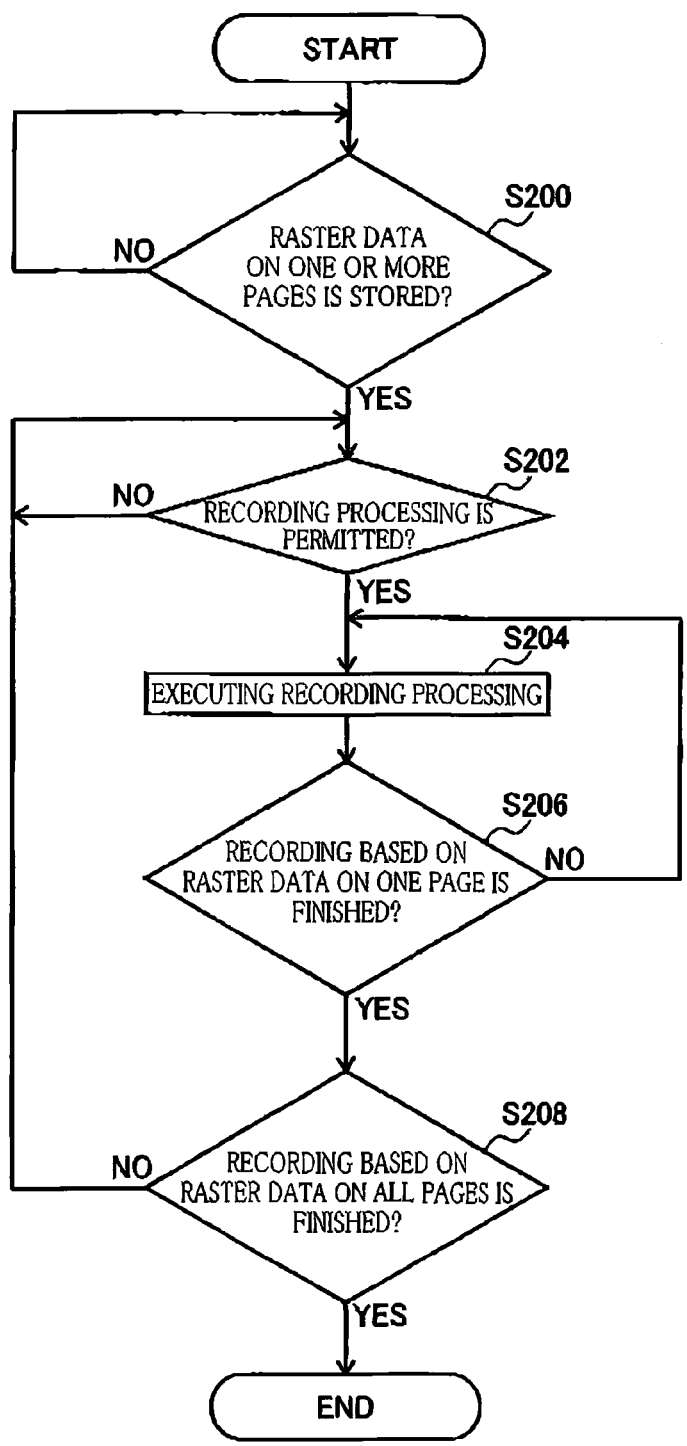
FIG. 11 is a flow chart illustrating processings in the printer according to the first embodiment.

When the control program 32 is executed by the CPU 12, as illustrated in FIG. 11, the CPU 12 at S200 determines whether raster data on one page is stored in the first RAM 26. When the raster data on the one page is not stored in the first RAM 26 (S200: NO), the CPU 12 repeats the processing at S200. When the raster data on the one page is stored in the first RAM 26 (S200: YES), the CPU 12 at S202 determines whether the recording processing is permitted.

Specifically, the CPU 12 determines that the recording processing is permitted, when the data transferring flag F is OFF, and the instruction for pausing the recording processing is not output or when the data transferring flag F is OFF, and the instruction for canceling the pause of the recording processing is output after the instruction for pausing the recording processing is output. That is, the CPU 12 determines that the recording processing is not permitted when the data transferring flag F is ON or when the instruction for pausing the recording processing is output, and the instruction for canceling the pause of the recording processing is not output. When the recording processing is not permitted (S202: NO), the CPU 12 repeats the processing at S202.

When the recording processing is permitted (S202: YES), the CPU 12 at S204 executes the recording processing. The CPU 12 at S206 determines whether the recording processing for recording the image based on the raster data on the one page is finished. When the recording processing for recording the image based on the raster data on the one page is not finished (S206: NO), this flow returns to S204. When the recording processing for recording the image based on the raster data on the one page is finished (S206: YES), the CPU 12 at S208 determines whether the recording processing for recording the images based on the raster data on all the pages is finished. When the recording processing for recording the images based on the raster data on all the pages is not finished (S208: NO), this flow returns to S202. When the recording processing for recording the images based on the raster data on all the pages is finished (S208: YES), this flow ends.

Second Embodiment

In the printer 10 according to the first embodiment, the CPU 12 disables the RIP processing from being suspended in response to the operation on the execution button when the page of the page description language being analyzed at the timing when the execution button is operated is the same as the page of the page description language being analyzed at the timing when the interrupt button is operated. In the printer 10 according to the second embodiment, the RIP processing is suspended in response to the operation on the execution button regardless of the page of the page description language being analyzed at the timing when the execution button is operated. With this configuration, when the user desires to execute the interrupt print processing immediately, the printer 10 can accept a user instruction without the user waiting. Also, in the printer according to the first embodiment, when the execution button is operated, the recording processing is suspended after the completion of the recording processing for the page being executed at the timing when the execution button is operated. In the printer 10 according to the second embodiment, in contrast, when the interrupt button is operated, the recording processing is suspended after the completion of the recording processing for the page being executed at the timing when the interrupt button is operated.

In the printer 10 according to the second embodiment, the print processing is executed when the control program 32 is executed by the CPU 12 of the printer 10 according to the second embodiment. There will be explained, with reference to FIGS. 12 and 13, flows of processings to be executed when the control program 32 is executed. In the printer 10 according to the second embodiment, as in the first embodiment, four flows are executed when the control program 32 is executed. Two of the four flows are substantially identical to the flows illustrated in FIGS. 9 and 10 and FIG. 11 in the first embodiment. The second embodiment differs from the first embodiment in that the area of the first RAM 26 which stores the raster data transferred to the flash memory 24 may be released at S142 in the data transfer processing sub-routine illustrated in FIG. 7, that is, the CPU 12 need not wait until the execution button is operated, and that the raster data on all the pages transferred to the flash memory 24 is returned to the first RAM 26 at S152 in the return processing sub-routine illustrated in FIG. 8. In the following description for the second embodiment, illustrations and explanations of the substantially identical flows are dispensed with. Also, some processings in the other two flows are similar to those in the first embodiment, and an explanation of which will be provided briefly.

Figure 12:
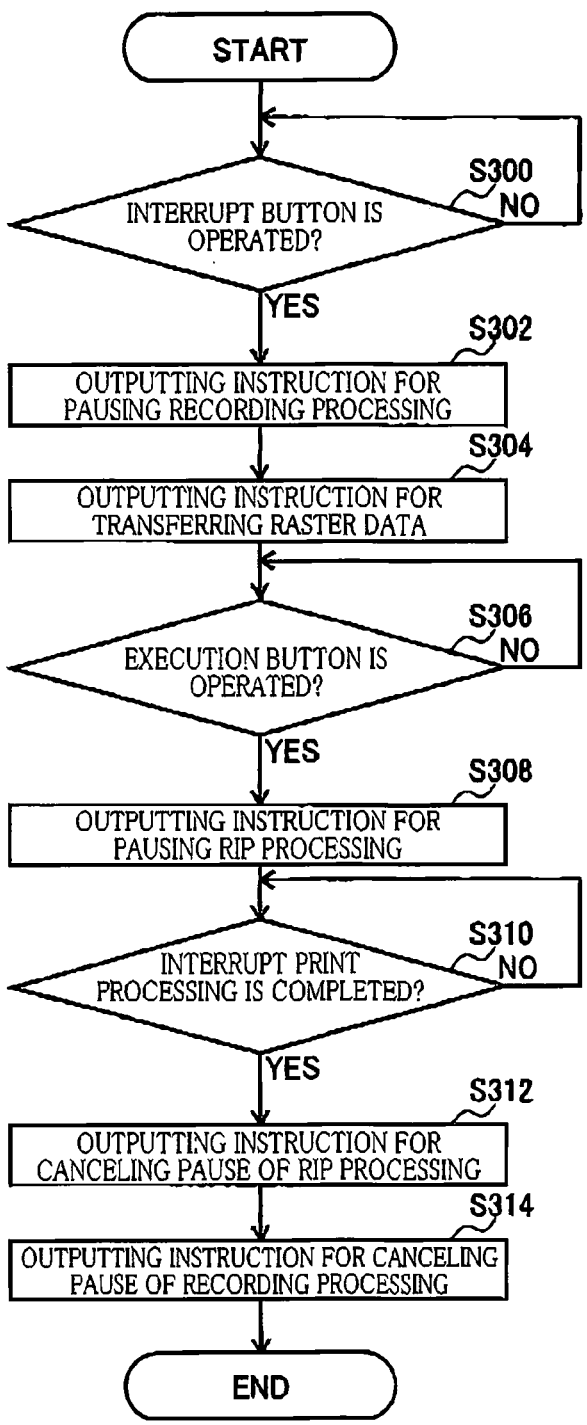
FIG. 12 is a flow chart illustrating processings in a printer according to a second embodiment.

In the printer 10 according to the second embodiment, when the control program 32 is executed, as illustrated in FIG. 12, the CPU 12 at S300 determines whether the interrupt button is operated. When the interrupt button is not operated (S300: NO), the CPU 12 repeats the processing at S300. When the interrupt button is operated (S300: YES), the CPU 12 at S302 outputs the instruction for pausing the recording processing. Processings at S304-S314 are similar to the processings at S102, S104, and S108-S114 in FIG. 5, and an explanation of which is dispensed with.

Figure 13:
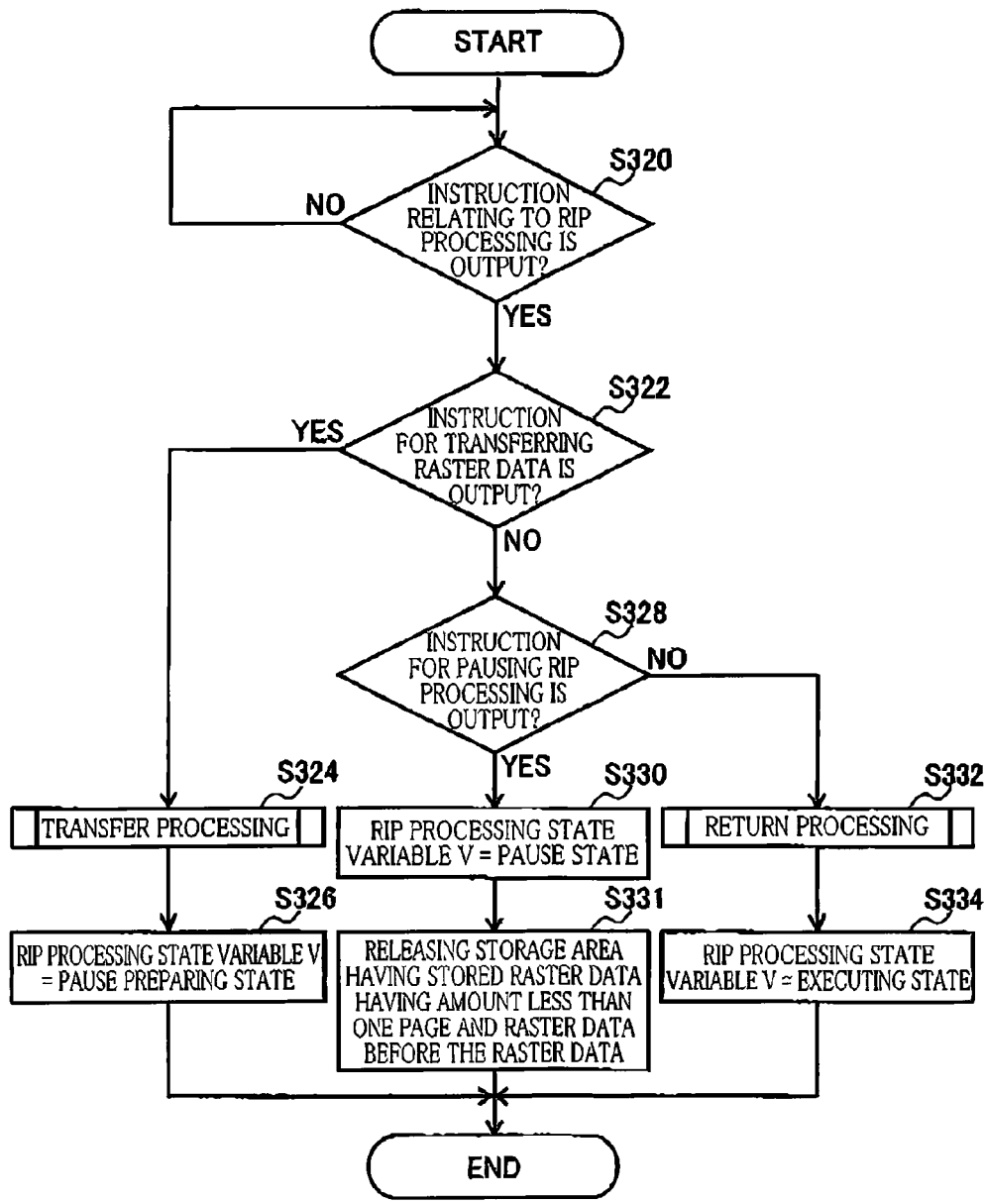
FIG. 13 is a flow chart illustrating processings in the printer according to the second embodiment.

In the printer 10 according to the second embodiment, when the control program 32 is executed, as illustrated in FIG. 13, the CPU 12 executes processings at S320-S334, which are similar to the processings at S120-S128 and S130-S134 in FIG. 6, and an explanation of which is dispensed with. However, in the second embodiment, as described above, the area of the first RAM 26 which stores the raster data transferred to the flash memory 24 may be released at S142 in the data transfer processing sub-routine illustrated in FIG. 7. Thus, when only the raster data having an amount less than one page is stored in the first RAM 26 at S131, only the area of the first RAM 26 which stores the raster data is released.

While the embodiments have been described above, it is to be understood that the disclosure is not limited to the details of the illustrated embodiments, but may be embodied with various changes and modifications, which may occur to those skilled in the art, without departing from the spirit and scope of the disclosure. For example, in the above-described embodiments, when the interrupt button is operated, the raster data for which the recording processing has not been executed among the raster data stored in the first RAM 26 is transferred to the flash memory 24 on a page-by-page basis. Specifically, in the example illustrated in FIG. 4, the raster data on the fourth to sixth pages is transferred to the flash memory 24. When the RIP processing is continued, and the raster data on the seventh page is stored into the first RAM 26, the raster data on the seventh page is transferred to the flash memory 24.

In an alternative embodiment, the raster data for which the recording processing has not been executed among the raster data stored in the first RAM 26 may be transferred to the flash memory 24 on a page-by-page basis after the operation on the interrupt button and the completion of the RIP processing for the page description language on the page which is being analyzed at the timing when the interrupt button is operated. Specifically, in the example illustrated in FIG. 4, the printer 10 may be configured such that the raster data on the fourth to sixth pages is not transferred to the flash memory 24 when the interrupt button is operated, and the raster data on the fourth to seventh pages is transferred to the flash memory 24 after the raster data on the seventh page is stored into the first RAM 26.

In the above-described embodiments, the CPU 12 does not interrupt the RIP processing in response to the operation on the execution button until the RIP processing is finished for the page description language on the page being analyzed when the interrupt button is operated. However, the CPU 12 may disable the suspension of the RIP processing by disabling the acceptance of the operation of the execution button before the completion of the RIP processing for the page description language on the page being analyzed when the interrupt button is operated. Specifically, in the above-described embodiments, when the interrupt button is operated, the display 14 displays the setting screen that contains the execution button from the beginning. In another alternative embodiment, the printer 10 may be configured such that when the interrupt button is operated, the display 14 displays the setting screen not containing the execution button and displays the execution button on the setting screen after the completion of the RIP processing for the page description language on the page being analyzed when the interrupt button is operated. This configuration can disable the acceptance of the operation on the execution button to disable the suspension of the RIP processing before the completion of the RIP processing for the page description language on the page being analyzed when the interrupt button is operated. In another alternative embodiment, in the case where the execution button is displayed on the display 14 before the completion of the RIP processing for the page description language on the page being analyzed at the operation on the interrupt button, when the execution button is operated before the completion of the RIP processing, the display 14 may display a message "Please wait until RIP is finished" and disable a user input using the execution button, and when the RIP processing is finished, a user input using the execution button may be accepted, for example.

In the interrupt print processing, the image recorder 20 records images read by the image reader 18 in the above-described embodiments. However, the image recorder 20 may record images stored in the flash memory 24, for example.

While the processings illustrated in FIGS. 5-13 are executed by the CPU 12 in the above-described embodiments, other devices may execute these processing. For example, these processings may be executed by an ASIC or other logical integrated circuits and may be executed by cooperation of the CPU 12, the ASIC, and other the logical integrated circuits, for example.

What is claimed is:

1. An image recording apparatus, comprising:
   an image recorder configured to record an image based on image data of one job that is accepted;
   a user interface configured to accept an input based on a user operation;
   a first storage;
   a second storage; and
   a controller configured to perform:
      creating raster data by analyzing a page description language described on a page-by-page basis;
      storing the created raster data into the first storage;
      controlling the image recorder to record the image based on the raster data stored in the first storage;
      accepting, via the user interface, advance notification about execution of interrupt recording in which the controller suspends recording based on a first job as the one job and controls the image recorder to perform recording based on a second job, the first job containing a first processed page and a second processed page that is a page after the first processed page;
      in a case where the advance notification about execution of the interrupt recording is accepted via the user interface at a first time point that is a middle of creation of raster data on the first processed page of the first job and where an instruction for execution of the interrupt recording is accepted via the user interface at a second time point that is a middle of creation of raster data on the second processed page of the first job, continuing creation of the raster data on the first job and storing of the created raster data into the first storage until the second time point is reached;
      storing yet-to-be-recorded raster data into the second storage on a page-by-page basis, the yet-to-be-recorded raster data being a portion of the raster data on the first job and being stored in the first storage, the yet-to-be-recorded raster data corresponding to at least one page for which recording is not performed by the image recorder and corresponding to at least one page before the second processed page; and
      in response to storing the yet-to-be-recorded raster data into the second storage, releasing a storage area of the first storage which stores the raster data created for the first job.

2. The image recording apparatus according to claim 1, wherein the controller is configured to:
   continue the creation of the raster data and the storing of the created raster data until completion of the creation of the raster data on the first processed page, when the advance notification about execution of the interrupt recording is accepted at the first time point; and store the yet-to-be-recorded raster data, comprising the first processed page, stored in the first storage, into the second storage on a page-by-page basis.

3. The image recording apparatus according to claim 2, wherein the controller is configured to suspend the creation of the raster data on the first job from the second time point when the advance notification about execution of the interrupt recording is accepted at the first time point and when the instruction for execution of the interrupt recording is accepted at the second time point.

4. The image recording apparatus according to claim 2, wherein the controller is configured to:

continue recording by the image recorder for a particular page of the first job, which recording is performed at the first time point, when the advance notification about execution of the interrupt recording is accepted at the first time point; and suspend recording by the image recorder when recording of a specific page of the first job, which recording is performed at the second time point, is completed.

5. The image recording apparatus according to claim 4, wherein the controller is configured to:

cause raster data stored on a page-by-page basis in the second storage to be kept stored in the first storage until the instruction for execution of the interrupt recording is accepted at the second time point;

release a storage area of the first storage which stores the raster data stored in the second storage when the instruction for execution of the interrupt recording is accepted at the second time point; and control the image recorder to perform the recording from the first time point to the second time point based on the raster data on a page-by-page basis which is kept stored in the first storage.

6. The image recording apparatus according to claim 1, further comprising an image reader configured to read an image formed on a document, wherein the second job is a job based on which the image recorder records the image read by the image reader.

7. The image recording apparatus according to claim 1, wherein the controller is configured to:

when the advance notification about execution of the interrupt recording is accepted at the first time point and when the instruction for execution of the interrupt recording is accepted at a third time point that is a time point after the first time point and during creation of the raster data on the first processed page of the first job, suspend the creation of the raster data on the first processed page from the third time point; and store the yet-to-be-recorded raster data into the second storage on a page-by-page basis.

8. The image recording apparatus according to claim 7, wherein the controller is configured to continue the creation of the raster data on the first job and the storing of the created raster data until the third time point is reached except during the storing of the yet-to-be-recorded raster data stored in the first storage into the second storage, when the advance notification about execution of the interrupt recording is accepted at the first time point and when the instruction for execution of the interrupt recording is accepted at the third time point.

9. The image recording apparatus according to claim 7, wherein the controller is configured to, after the advance notification about execution of the interrupt recording is accepted at the first time point, store the raster data stored in the first storage on a page-by-page basis, into the second storage and release a storage area of the first storage which stores the raster data stored in the second storage on a page-by-page basis each time when the created raster data is stored into the first storage on a page-by-page basis.

10. The image recording apparatus according to claim 7, wherein the controller is configured to, when the advance notification about execution of the interrupt recording is accepted at the first time point, continue recording by the image recorder for a particular page of the first job, which recording is performed at the first time point, and control the image recorder not to perform recording for a page following the particular page in the first job.

11. The image recording apparatus according to claim 7, further comprising an image reader configured to read an image formed on a document, wherein the second job is a job based on which the image recorder records the image read by the image reader.

12. A non-transitory storage medium storing a plurality of instructions to be executed by a processor of an image recording apparatus, the image recording apparatus comprising:

an image recorder configured to record an image based on image data of one job that is accepted;

a user interface configured to accept an input based on a user operation;

a first storage; and a second storage, the plurality of instructions, when executed by the processor, causing the image recording apparatus to perform:

creating raster data by analyzing a page description language described on a page-by-page basis;

storing the created raster data into the first storage;

controlling the image recorder to record the image based on the raster data stored in the first storage;

accepting, via the user interface, advance notification about execution of interrupt recording in which the controller suspends recording based on a first job as the one job and controls the image recorder to perform recording based on a second job, the first job containing a first processed page and a second processed page that is a page after the first processed page;

in a case where the advance notification about execution of the interrupt recording is accepted via the user interface at a first time point that is a middle of creation of raster data on the first processed page of the first job and where an instruction for execution of the interrupt recording is accepted via the user interface at a second time point that is a middle of creation of raster data on the second processed page of the first job, continuing the creation of raster data on the first job and storing of the created raster data into the first storage until the second time point is reached;

storing yet-to-be-recorded raster data into the second storage on a page-by-page basis, the yet-to-be-recorded raster data being a portion of the raster data on the first job and being stored in the first storage, the yet-to-be-recorded raster data corresponding to at least one page for which recording is not performed by the image recorder and corresponding to at least one page before the second processed page; and in response to storing the yet-to-be-recorded raster data into the second storage, releasing a storage area of the first storage which stores the raster data created for the first job.

13. The image recording apparatus according to claim 12, wherein the plurality of instructions, when executed by the processor, cause the image recording apparatus to:
continue the creation of the raster data and the storing of the created raster data until completion of the creation of the raster data on the first processed page, when the advance notification about execution of the interrupt recording is accepted at the first time point; and
store the yet-to-be-recorded raster data, comprising the first processed page, stored in the first storage, into the second storage on a page-by-page basis.

14. The image recording apparatus according to claim 12, wherein the plurality of instructions, when executed by the processor, cause the image recording apparatus to:
suspend the creation of the raster data on the first job from the second time point when the advance notification about execution of the interrupt recording is accepted at the first time point and when the instruction for execution of the interrupt recording is accepted after the first time point and during the creation of the raster data on the first processed page; and
store the yet-to-be-recorded raster data stored in the first storage, into the second storage on a page-by-page basis.

* * * * *